(12) United States Patent
Jackson

(10) Patent No.: US 7,203,134 B1
(45) Date of Patent: Apr. 10, 2007

(54) PEOPLE-ON-THE-GO-WATCH

(76) Inventor: Eloise Jackson, 7929 S. Harvard 1st Floor, Chicago, IL (US) 60620

( * ) Notice: Subject to any disclaimer, the term of this patent is extended or adjusted under 35 U.S.C. 154(b) by 169 days.

(21) Appl. No.: 11/139,398

(22) Filed: May 26, 2005

Related U.S. Application Data

(60) Provisional application No. 60/617,229, filed on Oct. 8, 2004.

(51) Int. Cl.
*G04C 11/02* (2006.01)
*G04C 19/00* (2006.01)
*G04B 19/00* (2006.01)

(52) U.S. Cl. .......................... 368/47; 368/82; 368/223

(58) Field of Classification Search .................. 368/47, 368/82–84, 223, 241, 242
See application file for complete search history.

(56) References Cited

U.S. PATENT DOCUMENTS

| | | | |
|---|---|---|---|
| 5,150,954 A | * | 9/1992 | Hoff .......................... 340/7.34 |
| 5,194,857 A | | 3/1993 | Gomez |
| 5,251,189 A | * | 10/1993 | Thorp .......................... 368/4 |
| 5,537,407 A | * | 7/1996 | Park et al. .................. 370/314 |
| 5,861,686 A | | 1/1999 | Lee |
| 6,580,664 B2 | | 6/2003 | Magnusson |
| 2003/0039174 A1 | * | 2/2003 | Magnusson .................. 368/47 |

\* cited by examiner

*Primary Examiner*—Vit Miska
*Assistant Examiner*—Thanh S Phan

(57) ABSTRACT

A wrist watch that also has a pager function incorporated into it. The wrist watch comprises a flexible band and with a watch unit attached to the flexible band. The watch unit displays the time manually, while a LCD readout located on the flexible band displays the time electronically. The wrist watch also includes an incorporated receiver which can receive pages from pager units, with any message, numerical or otherwise, being viewable on the LCD readout. A mode button allows an individual to choose between viewing the time and viewing a received paged message on the LCD readout. The wrist watch also includes an incorporated LED indicator light that indicates if a page has been received.

5 Claims, 2 Drawing Sheets

PEOPLE-ON-THE-GO-WATCH

I. CROSS-REFERENCE TO RELATED APPLICATIONS

This application claims the benefit of U.S. Provisional Application No. 60/617,229, filed Oct. 8, 2004.

II. BACKGROUND OF THE INVENTION

The present invention concerns that of a wrist watch that also has a pager function incorporated into it.

III. DESCRIPTION OF THE PRIOR ART

U.S. Pat. No. 6,580,664, issued to Magnusson, discloses a waterproof watch with a built in pager and Global Positioning System.

U.S. Pat. No. 5,861,686, issued to Lee, discloses a device for generating both vibration and sound for small electronic devices.

U.S. Pat. No. 5,194,857, issued to Gomez, discloses a wrist watch pager capable of being recharged by a battery charger.

IV. SUMMARY OF THE INVENTION

The present invention concerns that of a wrist watch that also has a pager function incorporated into it. The wrist watch comprises a flexible band and with a watch unit attached to the flexible band. The watch unit displays the time manually, while a LCD readout located on the flexible band displays the time electronically. The wrist watch also includes an incorporated receiver which can receive pages from pager units, with any message, numerical or otherwise, being viewable on the LCD readout. A mode button allows an individual to choose between viewing the time and viewing a received paged message on the LCD readout. The wrist watch also includes an incorporated LED indicator light that indicates if a page has been received.

There has thus been outlined, rather broadly, the more important features of a wrist watch that has an incorporated pager function that the detailed description thereof that follows may be better understood and in order that the present contribution to the art may be better appreciated. There are, of course, additional features of the wrist watch that has an incorporated pager function that will be described hereinafter and which will form the subject matter of the claims appended hereto.

In this respect, before explaining at least one embodiment of the wrist watch that has an incorporated pager function in detail, it is to be understood that the wrist watch that has an incorporated pager function is not limited in its application to the details of construction and to the arrangements of the components set forth in the following description or illustrated in the drawings. The wrist watch that has an incorporated pager function is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present wrist watch that has an incorporated pager function. It is important, therefore, that the claims be regarded as including such equivalent constructions insofar as they do not depart from the spirit and scope of the present invention.

It is therefore an object of the present invention to provide a wrist watch that has an incorporated pager function which has all of the advantages of the prior art and none of the disadvantages.

It is another object of the present invention to provide a wrist watch that has an incorporated pager function which may be easily and efficiently manufactured and marketed.

It is another object of the present invention to provide a wrist watch that has an incorporated pager function which is of durable and reliable construction.

It is yet another object of the present invention to provide a wrist watch that has an incorporated pager function which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
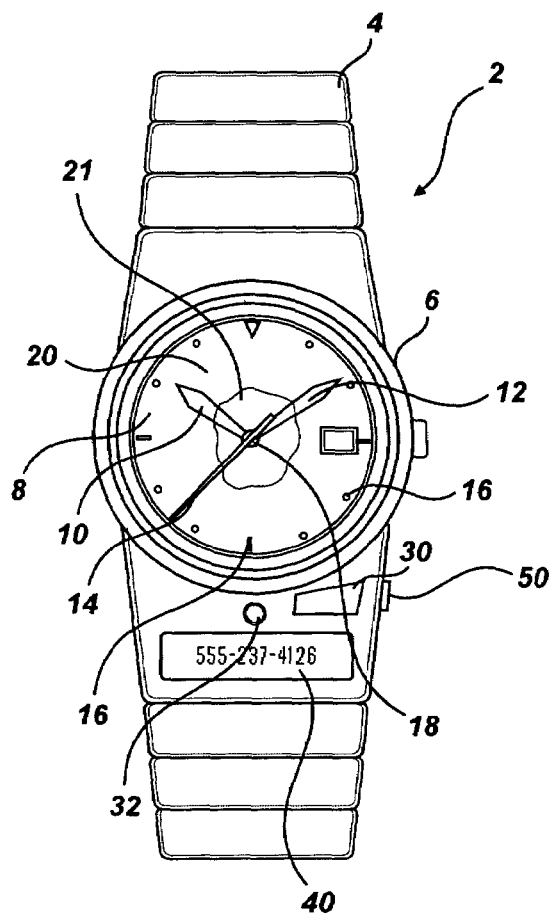
FIG. 1 shows a top perspective view of the wrist watch.
Figure 2:
FIG. 2 shows a bottom perspective view of the wrist watch.

FIG. 1 shows a top perspective view of the wrist watch 2, while FIG. 2 shows a bottom perspective view of the wrist watch. Wrist watch 2 comprises a flexible band 4 that has two ends, a first end and a second end, and also has a watch unit 6 that has two ends, a top end and a bottom end. The first end of the flexible band 4 is connected to the top end of the watch unit 6, while the second end of the flexible band 4 is connected to the bottom end of the watch unit 6. The watch unit 6 has two faces, a top face and a bottom face.

The top face of the watch unit 6 has a covering 8 which covers the clock face 20. Visible on top of the clock face 20 are an hour hand 10, a minute hand 12, a second hand 14, and a plurality of markings 16 that are used by an individual to tell time. The hour hand 10, minute hand 12, and second hand 14 are all axially attached to a central axis 18, which is connected to the gear works 21 of the watch unit 6 and pokes through the clock face 20. Gear works 21 are only representationally shown and are located below the clock face 20 of the watch unit 6.

The wrist watch has an incorporated receiver 30 which is designed to accept incoming pages through a pager. The receiver 30 is incorporated into the flexible band 4 near the bottom end of the watch unit 6 and is connected to a light emitting diode (LED) indicator light 32, which is also incorporated into the flexible band 4 near the bottom end of the watch unit 6. Once a page is received by receiver 30, the receiver causes the indicator light 32 to intermittently flash to notify an individual wearing the wrist watch 2 that a page has been received.

Located adjacent to the indicator light 32 is a liquid crystal display (LCD) readout 40 that can be display either the time or a number that is received as a part of the page. A mode button 50 is located on the flexible band 4 and the mode button 50 will allow an individual to choose between viewing the time or viewing a sent phone number through the readout 40.

FIG. 2 shows a rear access panel door 60, which covers up a battery compartment 62 where at least one battery 64 is located. The battery compartment 62 and the rear access panel door 60 is accessible through the bottom face of the watch unit 6. The battery 64 provides power to the wrist watch 2 and is replaceable as needed.

Figure 3:
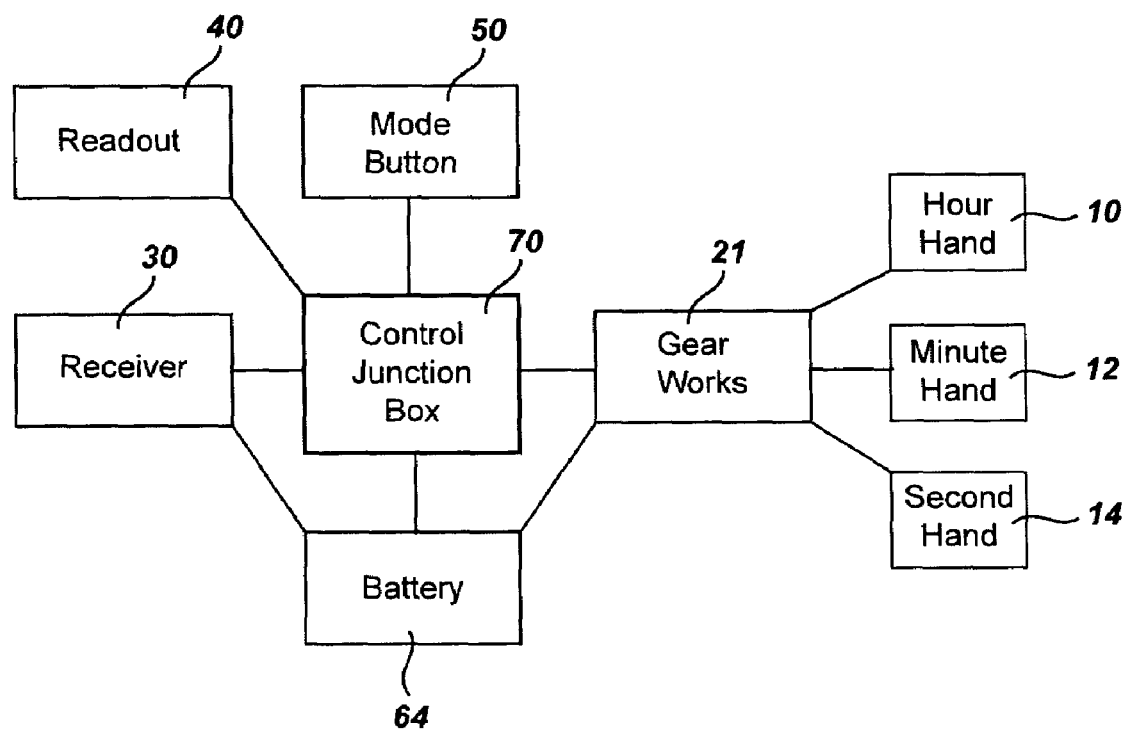
FIG. 3 shows an electronic schematic of the electronics within the wrist watch.

FIG. 3 shows an electronic schematic of the electronics within the wrist watch 2. Gear works 21 are connected to hour hand 10, minute hand 12, and second hand 14 to manually tell time. Also, gear works are connected to a control junction box 70, which can allow the time to be displayed on the readout 40. Control junction box 70 is controlled by mode button 50, which switches the control junction box 70 between one of two different modes, a "time" mode and a "page" mode. Receiver 30 also is connected to the control junction box 70. Control junction box 70 is connected to readout 40 and will display the proper data on the readout 40, depending on what mode it is on, as determined by mode button 50. Receiver 30 and gear works 21 are connected to battery 64 for a power source.

I claim:

1. A wrist watch comprising:
   (a) a flexible band having two ends, a first end and a second end,
   (b) a watch unit having two ends, a top end and a bottom end, the watch unit also having two faces, a top face and a bottom face, the top end of the watch unit being attached to the first end of the flexible band, the bottom end of the watch unit being attached to the second end of the flexible band,
   (c) a clock face located on the top face of the watch unit,
   (d) a plurality of indicia within the watch unit, the plurality of indicia being used by an individual to tell time,
   (e) a covering attached to the top face of the watch unit,
   (f) a receiver incorporated into the flexible band near the bottom end of the watch unit, the receiver capable of receiving and recognizing incoming pager signals,
   (g) a light emitting diode (LED) incorporated into the flexible band near the bottom end of the watch unit, the LED connected to the receiver,
   (h) a liquid crystal display (LCD) readout attached to the flexible band near the bottom end of the watch unit, the LCD readout being located adjacent to the LED, the LCD readout designed to display information that is received as part of an incoming pager signal received and recognized by the receiver,
   (i) means for alternating between various types of information displayed on the LCD readout, and
   (j) power means for providing power to the wrist watch.

2. A wrist watch according to claim 1 wherein the power means for providing power to the wrist watch further comprises:
   (a) a battery compartment being located within the watch unit, the battery compartment being covered by a rear access panel door located on the bottom face of the wrist watch, and
   (b) at least one battery being located within the battery compartment.

3. A wrist watch according to claim 2 wherein the LCD readout can display either the current time or an incoming telephone number from an incoming page that has been received and recognized by the receiver.

4. A wrist watch according to claim 3 wherein the means for alternating between various types of information displayed on the LCD readout further comprises a mode button located on the flexible band, the mode button allowing an individual to choose between viewing the current time or viewing the last incoming telephone number from an incoming page that has been received and recognized by the receiver.

5. A wrist watch according to claim 4 wherein the plurality of indicia within the watch unit further comprises:
   (a) an amount of gear works located within the watch unit,
   (b) a central axis attached to the amount of gear works, the central axis poking through the clock face,
   (c) an hour hand axially attached to the central axis,
   (d) a minute hand axially attached to the central axis,
   (e) a second hand axially attached to the central axis, and
   (f) a plurality of markings located on the clock face.

* * * * *